United States Patent
Chien et al.

[11] 3,957,835
[45] May 18, 1976

[54] BROMINATED AZIDO FIRE RETARDANTS

[75] Inventors: James C. W. Chien, Amherst, Mass.; Frederick George Schappell, Newark, Del.

[73] Assignee: Hercules Incorporated, Wilmington, Del.

[22] Filed: Jan. 15, 1975

[21] Appl. No.: 541,182

[52] U.S. Cl. .......................... 260/349; 260/45.8 R; 8/181; 8/194
[51] Int. Cl.² .................................... C07C 117/00
[58] Field of Search .................................... 260/349

[56] References Cited
UNITED STATES PATENTS 3,220,985   11/1965   Breslow ............................. 260/349

*Primary Examiner*—Lewis Gotts
*Assistant Examiner*—Cary Owens
*Attorney, Agent, or Firm*—Marion C. Staves

[57] ABSTRACT

Disclosed are brominated azido fire-retardants having the formula

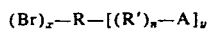

where R is an organic radical; R' is selected from

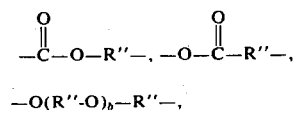

where R'' is selected from alkylene, cycloalkylene, alkylene cycloalkylene, arylene, alkylene arylene, and the foregoing radicals with bromo substituents, and $b$ is an integer from 1 to 10; A is selected from

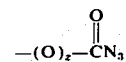

and $-SO_2N_3$ where $z$ is 0 or 1; $x$ is at least 3; $n$ is 0 or 1; and $y$ is an integer from 1 to 100. Also disclosed is the process of preparing fire-retardant natural and synthetic fibers and films which comprises contacting the surface of said fiber or film with a brominated azido fire-retardant and initiating reaction of the fire-retardant with the fiber or film by heat or irradiation.

9 Claims, No Drawings

BROMINATED AZIDO FIRE RETARDANTS

This invention relates to a new class of fire-retardant compounds and their use in treating natural and synthetic fibers and films. More particularly this invention relates to brominated azido fire-retardant compounds and their use in surface-treating natural and synthetic fibers and films.

It is common practice to treat natural and synthetic fibers, yarns, fabrics and films with fire-retardant compounds. However, in the past large amounts of treating agents had to be used because of their lack of durability, i.e., ease of removal by washing and/or dry cleaning. The use of higher initial add-on to compensate for such loss usually resulted in disadvantages such as stiffness, discoloration and ease of soiling.

Many times fire-retardant compounds were incorporated into the powdered or molten polymeric precursors of fibers, yarns and films in an effort to make them more permanent. However, such incorporation often caused discoloration and polymer degradation during spinning, as well as adversely affecting polymer stability and strength.

It has now been surprisingly found that brominated compounds having the formula $(Br)_x$—R—[(R')$_n$—A]$_y$ where R can be any organic radical inert to azido groups; R' is selected from

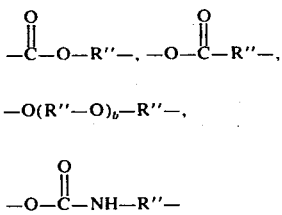

and

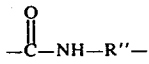

where R'' is selected from alkylene, cycloalkylene, alkylene cycloalkylene, arylene, alkylene arylene and their brominated counterparts, where the alkylene groups contain 1 to 20 carbon atoms, the cycloalkyl groups contain 5 to 12 carbon atoms and 1 to 2 rings and the aryl groups contain 1 to 2 rings, and $b$ is 1 to 10; A is selected from

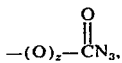

and —SO$_2$N$_3$ where $z$ is 0 or 1; $x$ is at least 3; $n$ is 0 or 1; and $y$ is 1 to 100 most preferably 1 to 10; can be used to surface-treat natural or synthetic fibers and films to impart durable fire retardance. In general R will be alkylene, polyalkylene, cycloalkylene, alkylene cycloalkylene, arylene, alkylene arylene, poly(alkenyl arylene), alkylene-oxy-alkylene, poly(alkylene oxide), alkylene-oxy-arylene, alkylene-oxy-cycloalkylene, cycloalkylene-oxy-cycloalkylene, poly(cycloalkylene oxide), cycloalkylene-oxy-arylene, arylene-oxy-arylene, poly(arylene oxide), alkylene carboalkoxy, alkylene carboaryloxy, alkyl alkylene carboxylate, aryl alkylene carboxylate, alkylene carbonyl arylene, cycloalkylene carbonyl cycloalkylene, alkylene carbonyl alkylene, and arylene carbonyl arylene; where the alkyl and alkylene groups contain 1 to 18 carbon atoms, the alkene groups contain 2 to 5 carbon atoms, the cycloalkyl groups contain 5 to 12 carbon atoms and 1 to 2 rings and the aryl groups contain 1 to 2 rings. In addition it may be desirable to use R groups which have been substituted with phosphate or phosphite groups. In general, where the R groups are substituted with phosphate or phosphite groups, the phosphorus will be present in an amount of from about 0.1 to 10% by weight of the compound.

Typical of the brominated azido compounds of this invention are tribromoacetylazide, brominated linoleyl azidoformate containing an average of four bromines, tetrabromohexanesulfonylazide, tribromoneopentyl azidoformate, brominated nonane-1,9-disulfonylazide containing an average of four bromines, brominated poly(ethylene sulfonylazide) containing approximately 40% by weight of bromine and an average of 20 sulfonylazide groups, 2,4,6-tribromocyclohexyl azidoformate, brominated bicyclo[4.4.2]dodecane sulfonylazide containing an average of four bromines, tribromocyclopentyl azidoformate, 2-(tribromocyclohexyl)acetylazide, 1,4-bis-azidoformyloxymethyl)tetrabromocyclohexane, 2,4,6-tribromophenyl azidoformate, 2,4,6-tribromophenyl sulfonylazide, 2,4,6-tribromobenzoylazide, 2,3,4,5,6-pentabromophenyl azidoformate, brominated naphthyl azidoformate containing an average of four bromines, brominated biphenyl-bis-sulfonylazide containing an average of six bromines, 2,2-bis(4-azidoformyl-3,5-dibromophenyl)propane, 2,4,6-tribromobenzyl azidoformate, 1,4(bis-azidoformyloxymethyl)tetrabromobenzene, brominated poly(sulfonylazido styrene) containing approximately 38% bromine, an average of four sulfonylazide groups and having a molecular weight of approximately 500, $\beta,\beta,\beta$-tribromoethoxyethyl azidoformate, 4-(2,3-dibromopropyloxy)-2,3-dibromobutyl sulfonylazide, copolymer of glycidol and epibromohydrin where the hydroxyl groups have been converted to azidoformate groups and having a molecular weight of approximately 700, $\beta$-(2,3,4,5,6-pentabromophenoxy)ethyl azidoformate, 3-(2,4,6-tribromophenoxy)-propionylazide, 3-(2,4,6-tribromocyclohexyloxy)propyl sulfonylazide, brominated dicyclohexyl ether sulfonylazide containing an average of seven bromines, brominated bis-azidoformate of the tetramer of cyclohexanediol containing 16 bromines, 3-(2,3,4,5,6-pentabromocyclohexyloyx)-benzene sulfonylazide, 4,4'-diazidoformyl-2,2'-3,3'-, 5,5'-,6,6'-octabromodiphenylether, brominated bis-azidoformate of polyphenyleneoxide tetramer containing 16 bromines, the tribromoacetyl ester of pentaerythritol azidoformate, the tribromobenzoyl ester of pentaerythritol azidoformate, bis(2,3-dibromopropyl)-2-azidoformyloxymalonate, bis(3,4,6-tribromopehnyl)-2-azidoformyloxymalonate, 2,4,6-tribromophenylazidosulfonylmethyl ketone, the sulfonylazide of brominated dicyclohexyl ketone containing an average of six bromines, brominated 4-azidoformyloxy-3-methyl-2-butanone containing an average of three bromines, 4,4'-azidoformyloxy-2,2'-3,3'-5,5'-6,6'-octabromobenzophenone, bis[$\beta$-azidoformyloxyethyl]tetrabromophthalate, 4-azidoformyloxy-2,3-dibromobutyltribromoacetate, 3-azidoformyloxy-2,2-dibromomethylpropyltribromoacetate, $\beta,\beta,\beta$-tribromoethyl-3-azidoformyloxypropionate, brominated glyceryl tri(azidoformyloxystearate) containing an average of five bromines and substituted with approximately one phosphate group per molecule, the azidoformate of the ethylene oxide adduct of 2,4,6-tribromophenol containing on the average two ethylene oxide groups, the azidoformate of the epibromohydrin adduct of 2,4,6-tribromophenol containing on the average three epibromohydrin groups, $\beta,\beta,\beta$-tribromoethyl-4-azidosulfonylphenylcarbamate, N-(azidoformyloxymethyl)-2,2,2-tribromoacetamide, and N-(azidoformyloxyethyl)-2,2,2-tribromoacetamide.

Any natural or synthetic fiber or film can be made fire-retardant by treatment with a brominated azido compound in accordance with this invention. Typical natural and synthetic materials that can be made fire-retardant are the cellulosics such as cotton, cellophane, flax, sisal, jute, etc.; the keratinous materials such as wool, alpaca, etc.; silk; the polyamides such as the nylons, aramides, etc.; polyesters such as poly(ethyleneterephthalate), polymers of cyclohexane dimethanol and terephthalic acid, etc.; the polyolefins such as polyethylene, polypropylene, copolymers of ethylene and propylene, etc.; cellulose esters such as cellulose acetate; the cellulose partial alkyl ethers such as hydroxyethyl and hydroxypropyl cellulose; regenerated cellulose such as viscose rayon; nitrocellulose; acrylonitrile polymers and copolymers such as polyacrylonitrile, the copolymer of methyl acrylate and acrylonitrile, etc.; polystyrene; and the polyurethanes such as the copolymer of hexamethylenediisocyanate and tetramethyleneglycol.

It is well known that sulfonylazides can be prepared by the reaction of a sulfonyl chloride with an alkali metal azide or by reacting a sulfonyl hydrazide with nitrous acid. Likewise, the brominated sulfonylazides can be prepared from their brominated counterparts. The brominated azidoformates can be prepared in various ways, as, for example, by reacting a brominated chloroformate with an excess, i.e., from about 1.05 moles to about 10 moles per equivalent of chloroformate, of an alkali azide. Similarly, brominated acyl azides can be prepared by the reaction of a brominated acylhalide with an alkali azide.

The brominated azido compounds of this invention can be reacted with natural or synthetic fibers either before or after they are fabricated as finished products. In other words, fibers can be reacted before fabrication or after they have been spun and woven or knitted into a fabric. In general, the fibers and films will be contacted with the brominated azide compounds by dipping in, brushing on, spraying with, padding with, etc. solutions, emulsions, or dispersions of the compounds. Typical solvents for the brominated azido compounds are chlorinated hydrocarbons, ketones, etc. As indicated above, unlike the prior art processes using nondurable fire-retardants, the process of this invention requires the use of only small amounts of the novel compounds. In general an initial add-on of from about 1 to 30%, most preferably 2 to 20%, by weight of the brominated azido compounds produces significant fire retardancy. More of the brominated azido compounds can be used but excess amounts may produce stiffness and/or discoloration.

The reaction between the brominated azido compound and the fiber or film is initiated by heat or irradiation. When it is effected by heating, the temperature will depend upon the specific brominated azido compounds as well as the specific fiber or film. In general, the temperature will be in the range of from about 70°C. to about 400°C. It will be recognized by those skilled in the art that those compounds containing sulfonylazide groups will generally react at a temperature about 50° higher than the other compounds. Reactions initiated by irradiation are independent of temperature and can be performed above, at or below room temperature. The rate of the reaction will depend on the intensity of the source of radiation and its distance from the reaction. The wavelengths used will generally be in the range of from about 2,000 A to 4,000 A. These can be supplied by sources such as high- and low-pressure mercury lamps, cathode ray tubes, etc. Photosensitizers can be added to increase the absorption.

In addition to the brominated azido compounds, other ingredients useful in fire retardancy may be present in the process of this invention. Additives commonly used in fire retardancy may be present here also, as for example, antimony oxide, compounds containing peroxide groups such as $\alpha,\alpha$-bis(t-butyl peroxy)-m,p-diisopropylbenzene, phosphorus-containing compounds, nitrogen-containing compounds, etc.

The following examples are presented to illustrate the invention, parts and percentages being by weight unless otherwise specified.

EXAMPLE 1

This example illustrates the preparation and use of bis($\beta$-azidoformyloxyethyl)tetrabromophthalate.

Tetrabromophthalic anhydride (116 parts) was converted to the corresponding hydroxyethyl ester by refluxing with an excess of ethylene glycol. After removal of the excess ethylene glycol a yellowish-white oil remained, which was identified as bis($\beta$-hydroxyethyl)tetrabromophthalate. This intermediate was converted to the corresponding chloroformate by reaction with an excess of phosgene. After decomposition of any excess phosgene the chloroformate was converted to the azidoformate by contacting with an aqueous solution of sodium azide. The infrared analysis was consistent with the expected structure of bis($\beta$-azidoformyloxyethyl)tetrabromophthalate A 13 by 13-inch swatch of a 4.7 oz./sq.yd. oxford weave polypropylene curtain fabric was scoured to remove any finishing agents or size. A perchloroethylene solution of the fire-retardant agent was padded onto the swatch to deposit 10.7% on weight of fabric. The thus-treated fabric was dried and reaction initiated by heating for 1 hour at 130°C. A 3 by 12½-inch fabric specimen was suspended vertically in a metal frame with a 2 by 12-inch opening and ignited for 12 seconds with a 1 to 1½-inch yellow flame from a Bunsen burner. In triplicate tests, the treated fabric and molten drip derived therefrom self-extinguished instantaneously when the flame was removed. A control swatch of the same fabric untreated with the brominated azido compound continued to burn for an average of 17 seconds in triplicate tests. Even after five launderings using water and detergent the treated fabric selfextinguished instantaneously.

EXAMPLE 2

This example illustrates the preparation and use of $\beta,\beta,\beta$-tribromoethyl azidoformate.

Tribromoethanol (43.8 parts) was converted to the corresponding chloroformate by reaction with 40 parts of phosgene in the presence of a stoichiometric amount of base. The purified intermediate was reacted with an excess of sodium azide to produce the β,β,β-tribromoethyl azidoformate.

A 9 by 9-inch 100% cotton poplin swatch weighing 8 oz. per sq.yd. was dipped in a 20% tetrachloroethylene solution of the tribromoethyl azidoformate to deposit 13.1% by weight of the fire-retardant agent. The thus-treated fabric was dried and reaction initiated with a bank of ultraviolet lamps emitting radiation primarily in the 3,000 A range for 30 minutes. The lamps were approximately 2 inches from the fabric. The resulting treated fabric self-extinguished substantially faster than an untreated control in the flammability test described in Example 1. After repeated dry cleaning in perclene the fabric retained 92% of the fire retardant.

EXAMPLE 3

This example illustrates the preparation and use of a brominated and phosphated polyazidoformate derived from vegetable oil.

Brominated and phosphated polyhydroxylic vegetable oil (114.5 parts), sold under the trade name Brominex 160P and containing approximately 35% bromine, 2.6% phosphorus and having a hydroxyl number of 49 was contacted with 19.8 parts of phosgene in an organic solvent to produce the corresponding chloroformate. The intermediate was reacted with an excess of sodium azide to produce the corresponding polyazidoformate, containing on the average 1 to 6 azidoformate groups.

A 13 by 13-inch swatch of the polypropylene curtain fabric described in Example 1 was scoured, dried and then padded with a perchloroethylene solution of the polyazidoformate to deposit 2.1% on weight of fabric. The thus-treated fabric was dried and reaction initiated by heating for 1 hour at 130°C. A 3 by 12½ inch vertically free-hanging specimen of the treated fabric was tested for fire retardancy by igniting for 10 seconds while moving a Bunsen burner with a 6-inch flame to maintain the tip of a 1 to 1½ inch blue cone about 1 inch below the specimen as it shrinks. In triplicate tests the treated fabric required an average of 1⅔ seconds to self-extinguish after the flame was removed. An untreated control specimen in triplicate tests required an average of 43⅔ seconds to self-extinguish after the flame was removed.

After 5 launderings, using water and detergent, the above-treated fabric retained approximately 79% of the brominated azidoformate fire retardant. A sample of the fabric padded with Brominex 160P and laundered 5 times as described above retained only 7.5% of the Brominex.

EXAMPLE 4

This example illustrates the preparation and use of a brominated and phosphated polycarbamoylbenzene sulfonylazide derived from vegetable oil.

Brominated and phosphated polyhydroxylic vegetable oil (220 parts) sold under the trade name Brominex 711P and containing approximately 41% bromine, 2.7% phosphorus and a hydroxyl number of 46 was contacted with 27.5 parts of m-isocyanatobenzene sulfonylazide in benzene solution at 25°C. for 16 hours and then at 50°C. for 4 hours. The resulting brominated and phosphated polycarbamoylbenzene sulfonylazide, containing on the average from 1 to 6 carbamoylbenzene sulfonylazide groups was dissolved in perchloroethylene and padded on a 13 by 13 inch swatch of Dacron polyester woven fabric having a weight of approximately 4 oz./sq.yd. to deposit 21% on weight of fabric. The thus-treated fabric was dried and reaction initiated by irradiating at a distance of 3 inches for 1 hour with a bank of 12 fluorescent sun lamps emitting radiation primarily in the range of 2800 A to 3000 A at a distance of 3 inches. A 3 by 12½-inch treated fabric specimen was tested for fire retardancy as described in Example 3 and found to self-extinguish much faster than an untreated control.

A 3 mil polyester film (Mylar) was coated on one side with the above fire retardant by spreading a perchloroethylene solution using a doctor blade. The thus-coated film was dried and found to have 20% by weight add-on of fire-retardant. Reaction of the sulfonylazide fire-retardant with the film was initiated by irradiation exactly as described above. The resulting treated film was found to support a flame for a much shorter time than an untreated control.

EXAMPLE 5

This example illustrates the preparation and use of α,α,α-tribromoacetylazide.

Tribromoacetic acid (297 parts) was refluxed with 448 parts of thionyl bromide to yield the α,α,α-tribromoacetylbromide intermediate, which was in turn contacted with an aqueous solution of excess sodium azide.

A 13 by 13-inch swatch of wool worsted fabric having a weight of approximately 8 oz./sq.yd. was padded with a perchloroethylene solution of the tribromoacetylazide to deposite 5.2% on weight of fabric. The thus-treated fabric was dried and reaction initiated by irradiation exactly as described in Example 4. A 3 by 12½-inch treated fabric specimen was tested for fire retardancy as described in Example 3 and found to self-extinguish much faster than an untreated control. The fire-retardant was retained on the fabric even after repeated dry cleaning.

EXAMPLE 6

This example illustrates the preparation and use of brominated biphenylsulfonylazide.

Biphenyl was chlorosulfonated and the monochlorosulfonate recovered. This intermediate was brominated by free radical mechanism to yield an intermediate containing on the average 4 bromines per molecule. The brominated intermediate was converted to the corresponding sulfonylazide by treating with sodium azide.

A 13 by 13-inch swatch of the polypropylene curtain fabric described in Example 1 was treated with the brominated biphenyl sulfonylazide by padding with a perchloroethylene solution to deposit 9.5% on weight of fabric. The thus-treated fabric was dried and reaction initiated by irradiation exactly as described in Example 4. A 3 by 12½-inch treated fabric specimen was tested for fire retardancy as described in Example 3 and found to self-extinguish much faster than an untreated control. The fire-retardant was retained on the fabric even after repeated laundering.

What we claim and desire to protect by Letters Patent is:

1. A brominated azido fire-retardant having the formula

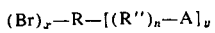

where R is selected from alkylene, polyalkylene, cycloalkylene, alkylene cycloalkylene, arylene, alkylene arylene, poly(alkenyl arylene), alkylene-oxy-alkylene, poly(alkylene oxide), alkylene-oxy-arylene, alkylene-oxy-cycloalkylene, cycloalkylene-oxy-cycloalkylene, poly(cycloalkylene oxide), cycloalkylene-oxy-arylene, arylene-oxy-arylene, poly(arylene oxide), arylene carboalkoxy, alkylene carboaryloxy, alkyl alkylene carboxylate, aryl alkylene carboxylate, alkylene carbonyl alkylene, alkylene carbonyl arylene, cycloalkylene carbonyl cycloalkylene and arylene carbonyl arylene radicals, where the alkyl and alkylene groups contain 1 to 18 carbon atoms, R' is selected from

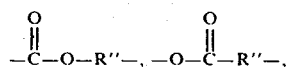

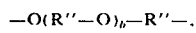

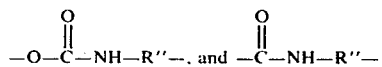

where R" is selected from alkylene, cycloalkylene, alkylene cycloalkylene, arylene, alkylene arylene and the foregoing radicals with bromo substituents, where the alkylene groups contain 1 to 20 carbon atoms, and $b$ is an integer from 1 to 10; A is selected from

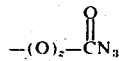

and $—SO_2N_3$ where $z$ is 0 or 1; $x$ is at least 3; $n$ is 0 or 1; and $y$ is an integer from 1 to 100.

2. The brominated azido fire-retardant of claim 1 substituted with phosphate or phosphite groups on the R group.

3. The brominated azido fire-retardant of claim 1 where A is

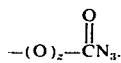

4. The brominated azido fire-retardant of claim 1 where A is $SO_2N_3$.

5. Bis($\beta$-azidoformyloxyethyl)tetrabromophthalate.

6. $\beta,\beta,\beta$-Tribromoethyl azidoformate.

7. Tribromopentaerythritol azidoformate.

8. The polyazidoformate derivative of saturated brominated and phosphated polyhydroxylic vegetable oil.

9. The polycarbamoylbenzene sulfonylazide derivative of saturated brominated and phosphated polyhydroxylic vegetable oil.

* * * * *